United States Patent [19]

Bourne

[11] 4,216,812

[45] Aug. 12, 1980

[54] PNEUMATIC TIRE CONTAINING PUNCTURE SEALANTS

[75] Inventor: Alan J. Bourne, Sutton Coldfield, England

[73] Assignee: Dunlop Limited, London, England

[21] Appl. No.: 931,930

[22] Filed: Aug. 8, 1978

[30] Foreign Application Priority Data

Aug. 11, 1977 [GB] United Kingdom ............... 33691/77

[51] Int. Cl.$^2$ .............................................. B60C 17/00
[52] U.S. Cl. ................................ 152/330 L; 152/347; 156/115
[58] Field of Search ............ 156/115; 152/152, 330 R, 152/330 L, 330 RF, 346, 347, 348

[56]  References Cited

U.S. PATENT DOCUMENTS

| 3,110,669 | 11/1963 | Borg ................................. 152/330 L |
| 3,931,843 | 1/1976 | Edwards et al. ................. 152/330 L |
| 3,935,893 | 2/1976 | Stang et al. .......................... 152/347 |
| 3,981,342 | 9/1976 | Farber et al. ......................... 152/347 |
| 4,051,884 | 10/1977 | Bourne et al. .................... 152/330 L |
| 4,057,090 | 11/1977 | Hoshikawa et al. ............. 156/115 X |
| 4,090,546 | 5/1978 | Honda et al. ......................... 152/347 |
| 4,096,898 | 6/1978 | Messerly et al. ................. 152/330 L |
| 4,109,695 | 8/1978 | Miyazato ............................. 152/347 |

FOREIGN PATENT DOCUMENTS

| 851309 | 5/1977 | Belgium . |
| 656913 | 9/1951 | United Kingdom . |
| 1283412 | 7/1972 | United Kingdom . |
| 1444347 | 7/1976 | United Kingdom . |

*Primary Examiner*—John E. Kittle
*Attorney, Agent, or Firm*—Stevens, Davis, Miller & Mosher

[57] ABSTRACT

A pneumatic tire to the interior surface of which there has been applied a puncture sealant containing a lubricant (as hereinbefore defined) comprising a polybutene and an amide wax.

20 Claims, No Drawings

PNEUMATIC TIRE CONTAINING PUNCTURE SEALANTS

This invention relates to pneumatic tires capable of running to a useful extent even when the tire is deflated, the tires having on their interior surface a puncture sealant, and to puncture sealants for use in the coatings.

Various proposals have been made for the use of materials applied to the interior surface of a pneumatic tire, in the event of the tire being punctured, will act as a sealant to seal the puncture and permit further use of the tire at least to an extent which will enable a vehicle equipped with the tires to be driven to a place of repair. Such materials are referred to herein as 'puncture sealants'. Proposals for the use of puncture sealants include, for instance, those in which the sealant is used in conjunction with means to re-inflate the tire, at least to some extent, after the sealant has sealed the puncture, and those which are used with a lubricant, that is, a material which facilitates relative movement between contacting regions of the interior surface of the tire when it is driven deflated; and in these latter cases the lubricant is conveniently incorporated in the sealant prior to application to the interior surface of the tire.

Puncture sealant compositions hitherto proposed have generally fallen into two groups; first compositions which owing to their viscous nature have to be applied by an extrusion method; and secondly, those of lesser viscosity, at least at elevated temperatures, which can conveniently be applied by simpler methods, for example spraying.

With regard to the first group, application by extrusion can be inconvenient, and fine particle silica with its attendant health hazards is commonly used as a gelling agent. With regard to the second group, some of the compositions soften or slump at relatively low temperatures, which can result in the disadvantage of the composition flowing away from the region of the tire surface subject to puncture, and thereby becoming less effective. There is, therefore, a need for puncture sealants which are sufficiently mobile to be applied conveniently, for example by spraying or brushing, and yet which will remain substantially in place on the region or regions of the tire surface to which they have been applied.

It has now been found, according to the present invention, that the disadvantage referred to above can be obviated, at least to a considerable extent, by using in the puncture sealant an amide wax or other high molecular weight amide compound, for example an amide resin of appropriate melting point (for example in the range from 100° to 150° C.).

Accordingly, in a first aspect the invention provides a puncture sealant suitable for application to the interior surface of a pneumatic tire, containing a lubricant (as hereinbefore defined) and an amide wax.

The use of an amide wax is particularly beneficial where the lubricant is a non-volatile lubricant and especially where it comprises a polyisobutylene or other polybutene, because we have found that amide waxes are good gelling agents for such polybutenes. It is with reference to the use of lubricants containing a gelled polyisobutylene that the description hereinafter particularly, but not exclusively, relates.

The polyisobutylene is conveniently one having a molecular weight of at least 350, for example in the range 750 to about 2500 though, as disclosed in the Examples below, polyisobutylenes of higher molecular weights can be used.

The amide waxes used in this invention can have one, two or more amide groups. They can also have one or more ester groups. One group of amide waxes which can be used are those having the general formula:

$$R_1-CO-NH-R_3-NH-CO-R_2$$

Where $R_1$ and $R_2$, which can be the same or different, are long chain radicals, (for example long chain hydrocarbon radicals), and $R_3$ is an alkylene radical, for example an alkylene radical having up to six carbon atoms.

$R_1$ and/or $R_2$ are conveniently alkyl radicals and each can have, for example, 12–35 carbon atoms. Good results have been obtained using a diamide wax having the structural formula shown above where $R_1$ is $C_{17}H_{35}-$, $R_2$ is $C_{27}H_{55}-$ and $R_3$ is $-CH_2-CH_2-$. In that compound the total number of carbon atoms in $R_1$ and $R_2$ is 44, which lies in the range 35–50 which is a convenient total number of carbon atoms for these two groups.

The puncture sealant preferably contains a solid particulate filler for example, a rubber, particularly one in a solid particulate form known as 'rubber crumb', though other substances, for example, wood flour, can be used. The filler used in the compositions of this invention can, for example, be of any of those disclosed in our cognate U.K. specifications Nos. 05,674/76 and 42,864/76.

The proportion of amide wax to be used in the puncture sealant depends to some extent on the nature of the other ingredients of the composition, and can be ascertained by means which will be apparent to those skilled in the art to which this invention relates. Suitable proportions, for example, are up to 20% (particularly 3% to 12%) by weight of the total weight of polyisobutylene and amide wax.

Where the puncture sealant contains rubber crumb, for example rubber crumb of 20 mesh size, the ratio by weight of rubber crumb:polyisobutylene can, for example, be in the range from 1:10 to 7.5:10, especially from 2:10 to 6:10 by weight.

The puncture sealant can contain, if desired, substances which act as gelling agents for polyisobutylenes in addition to the amide wax. Examples of such substances are polyolefins, for example polyethylenes. High density and/or low density polyolefins can be used. Their use normally calls for the use of each in an amount in the range of from 1 to 10% by weight of the lubricant. Where both low and high density polyethylenes are used, the low density polymer is normally in an amount greater than that of the high density polymer. However, it has been found that although an undesirable degree of waxiness is obtained when high levels of polyethylene are incorporated in polyisobutylene, the use of an amide wax in conjunction with normal levels of polyethylene (say up to 6%) allows the use of high gelling agent levels and hence the attainment of higher viscosities.

Puncture sealant compositions of the invention which are of particular interest are modifications of the puncture sealant compositions disclosed in our cognate U.K. specifications Nos. 05,674/76 and 42,864/76, the modification being the replacement of the high density polyethylene ingredient (and also, optionally, the low density polyethylene ingredient) by an appropriate amount of an amide wax. One advantage of this modification is that amide waxes in general are much more easily incorporated into liquid polyisobutylenes than are high density polyethylenes. For example, tests have shown that, incorporation of a high density polyethylene into polyisobutylene necessitates powerful mechanical stirring at 180° C., whereas use of an amide wax normally required only simple stirring and at a lower temperature too (150° C.).

The lubricant, especially where it comprises polyisobutylene, can contain a small proportion of an elastomer, for example butyl rubber, ethylene-propylene rubber, natural rubber, chloroprene or nitrile rubber. Suitable amounts, for example, are up to 10% (for instance 2–6%) by weight of the polyisobutylene.

The puncture sealants of this invention can be produced from their ingredients by methods analogous to those disclosed in cognate U.K. specifications Nos. 05,674/76 and 42,864/76. Although the amide compound can normally be incorporated in the lubricant by simple stirring, if desired it can be incorporated in similar fashion to that described in said cognate specifications for high density polyethylene. Similarly, the compositions of the present invention can be applied to pneumatic tires by the methods disclosed in said cognate U.K. specifications. Although spraying or brushing is generally preferred, extrusion can be used, if appropriate.

In a further aspect, the invention provides a tire to the interior surface thereof, especially the crown regions of said surface, there has been applied a puncture sealant of this invention.

The invention is illustrated by the following Examples. In the Examples the amide wax used was a diamide wax derived from stearic acid, montanic acid and ethylene diamine, and believed to have the formula $R_1$—CO—NH—CH$_2$—CH$_2$—NH—CO—$R_2$ where $R_1 = C_{17}H_{35}$; and $R_2 = R_{27}H_{55}$—.

EXAMPLES 1 TO 12

Twelve puncture sealant compositions of the invention, suitable for application to the interior surface of a run-flat tire were obtained by blending together a polyisobutylene, an amide wax, rubber crumb and, in some of the Examples, butyl rubber. The various polyisobutylenes used have different molecular weights, as follows:

|  | Molecular Weight |
|---|---|
| Hyvis 10 | 1,000 |
| Hyvis 200 | 2,400 |
| Oppanol B 10 | 10,000 |

Hyvis is a Trade Mark and the various Hyvis products referred to are sold by B.P. Chemicals Limited. Hyvis 10 is a polyisobutylene having up to 10% of 1-butene content. Oppanol is a Trade Mark and Oppanol B 10 is sold by Allied Colloids Ltd.

The butyl rubber used in the Examples was that obtained under the Trade Mark Polysar 301.

The proportions in which the ingredients were used in the various Examples is given in Table 1 below.

EXAMPLES 13 AND 14

Two further puncture sealant compositions suitable for application to the interior surface of a run-flat tire were obtained by blending together the following:

|  | EXAMPLE 13 | EXAMPLE 14 |
|---|---|---|
| Hyvis 10 | 94 | 94 |
| Rigidex 140/60 (a high density polyethylene m.p. 128°–140° C. manufactured by B.P. Chemicals Limited) | 2 | — |
| AC 8 (a low density polyethylene softening at 106°–108° C. manufactured by Allied Chemicals Limited) | 4 | 4 |
| Polysar 301 | 2 | 2 |
| 20 Mesh rubber crumb | 50 | 50 |
| Amide wax | 2.5 | 2.5 |

EXAMPLES 15 AND 16

Four further puncture sealant compositions were obtained by blending together the ingredients shown in Table 2 below, two of the compositions being according to the invention and two being comparisons containing no amide wax. The four compositions were tested to determine their flow temperature, and it will be seen that use of the amide wax resulted in a substantial increase in temperature stability.

TABLE 1

| Example No. |  | Polyisobutylene | Amide wax | Rubber crumb[a] | Butyl rubber[b] | Grease description | Viscosity (Ns/m$^2$)[c] |
|---|---|---|---|---|---|---|---|
| (a) |  | Using Hyvis 10 |  |  |  |  |  |
|  | 1 | 95 | 5 | 50 | — | Softish | 2907–3390 |
|  | 2 | 95 | 5 | 50 | 3 | Softish, stringier | 2299–2904 |
|  | 3 | 92.5 | 7.5 | 50 | — | Strong, tacky | 4600–5095 |
|  | 4 | 92.5 | 7.5 | 50 | 3 | Strong, tacky stringier | 4356–4598 |
|  | 5 | 90 | 10 | 50 | — | v.stiff, tacky | 7700–10300 |
|  | 6 | 90 | 10 | 50 | 3 | v.stiff, tacky stringier |  |
|  | 7 | 85 | 15 | 50 | — | v.stiff, tendency to waxiness | 12,100 |
| (b) |  | Using Hyvis 200 |  |  |  |  |  |
|  | 8 | 95 | 5 | 50 | — | V.stiff | — |
|  | 9 | 90 | 10 | 50 | — | v.stiff | — |
| (c) |  | Using Oppanol B10 |  |  |  |  |  |
|  | 10 | 95 | 5 | 50 | — | v.stiff but not tacky | — |
| (d) |  | Using Oppanol B10/Hyvis 10 (1/1.25) |  |  |  |  |  |

TABLE 1-continued

| Example No. | Polyisobutylene | Amide wax | Rubber crumb[a] | Butyl rubber[b] | Grease description | Viscosity (Ns/m²)[c] |
|---|---|---|---|---|---|---|
| 11 | 42.5/52.5 | 5 | 50 | — | v.stiff, tacky | — |
| 12 | 40/50 | 10 | 50 | — | v.stiff, tacky | — |

[a] 20 mesh whole tire crumb
[b] Polysar 301
[c] Measured on non-crumb containing samples using a Ferranti portable viscometer at $0.31_s{-}1$, at room temperature.

TABLE 2

|  | Comparison A | Example 15 | Comparison B | Example 16 |
|---|---|---|---|---|
| Composition |  |  |  |  |
| Hyvis 10 | 94 | 92.5 | 94 | 92.5 |
| Rigidex 140/160 | 2 | — | 2 | — |
| AC8 | 4 | — | 4 | — |
| Amide wax | — | 7.5 | — | 7.5 |
| Rubber crumb | — | — | 50 | 50 |
| Polysar 301 | 3 | 3 | 3 | 3 |
| Thermal stability | Flows at about 100–105° C. | Flows at about 130° C. | Flows at about 120° C. | Stable to about 140° C. |

EXAMPLES 17 TO 25

Nine further puncture sealants were obtained by blending together the ingredients shown in Table 3 below which also includes properties of sealants, including their viscosities at room temperature and 80° C., their flow temperatures and test results of some of them in tires.

EXAMPLES 26 AND 27

Although puncture sealant greases may be prepared from polyisobutylene and an amide wax alone, improved results in tires are obtained when a low density polythene is also included. This leads to superior mechanical stability during normal running of the tire. Low density polyethylene, for example the commercial product AC8, is readily incorporated at 150° C. and improved thermal stability is apparent over the full polyethylene system (i.e. Comparisons A and B, Table 2).

Two sealants containing both an amide wax (Glokem DMS) and a low density polyethylene (AC 8) were obtained by blending together the ingredients shown below respectively as Examples 26 and 27, and the flow temperatures of those sealants is compared with Comparisons $A_1$ and $B_1$.

|  | Comparison $A_1$ | Comparison $B_1$ | Example 26 | Example 27 |
|---|---|---|---|---|
| Hyvis 200 | 100 | 100 | 94 | 94 |
| AC8 | 6.5 | 6.5 | 6 | 6 |
| Rigidex 140/60 | 7.0 | 7.0 | — | — |
| Amide wax | — | — | 10 | 10 |
| 20 mesh rubber crumb | — | 50 | — | 44 |
| Flow temp (°C.) | 102–105* | 105–115 | 127 | 132 |

*samples had some tendency towards waxiness and cracking.

The sealant of Example 27, which was sprayable at about 160° C. was coated on the interior surface of a 155/65 SF 310 Denovo tire (Denovo is a Registered Trade Mark). The tire was inflated to 26 psi (158.7 k Pa) and then subjected to a revolving drum test simulating running on a road at 50 mph (80.46 km/hour). After the equivalent of 1000 miles (1609 km) running, the coating was examined and found to have remained in position on the inner surface of the tire. The width of coating across the tire was 3.38 inches (8.6 cm).

The puncture sealing effectiveness of the composition of Example 27 was assessed by its ability to seal holes made by drilling and by hammering nails directly into a tire.

(a) Drilled holes

Eight holes were made in the tire tread using an electric drill and bit of diameter 0.077 inch (0.196 cm). The leak rate of each hole was measured at 5 psi (34.5 k Pa) using a bubble flow meter and varied from 16 to 63 cc/sec. They were then temporarily plugged using nails of length one inch (2.54 cm) and diameter 0.084 inch (0.213 cm).

After coating the inner surface of the tire with the sealant composition and stabilisation by 'running' for one hour at 50 mph (80.46 km/hour) on a revolving drum, the pressure was set at 28 psi (193.2 k Pa) and the first nail removed. The tire was then run immediately for five minutes at 50 mph (80.46 km/hr). On stopping it was found that the hole had sealed. The tire was then reinflated to 28 psi (193.2 k Pa) and the test repeated for the other nails. All these holes sealed between 22.5 and 25 psi (155.1–172.5 k Pa). After removal of the last nail the tire was run for 7 hours at 50 mph (80.46 km/hr) and at the end of that period it was found that all the holes had remained sealed.

(b) Nail holes

Eight nails of length one inch (2.54 cm) and diameter 0.084 inch (0.213 cm) were hammered into the tire tread. After coating the inner surface of the tire with the sealant composition of Example 27 and stabilisation by running for one hour at 50 mph (80.46 km/hr), the nails were removed from the tire one by one. If, after removal of a nail, the resulting puncture "hole" leaked the tire was run for a further five minutes at 50 mph (80.46 km/hr) and the pressure re-checked. Otherwise, without further running, the next nail was removed.

As a result of these eight nail tests it was found that one sealed without running, and the maximum pressure loss was as little as 0.5 psi (3.46 k Pa) from an initial pressure of 28 psi (193.2 k Pa).

The results of the drilled hole test, together with some other results, are given below.

| FURTHER PROPERTIES OF EXAMPLE 27 | | |
|---|---|---|
| 1. | Viscosity (Ns/m² at $0.31s^{-1}$) | determined in absence of crumb. |
|  | Room temperature | >12,100 |
|  | 80° C. | 3690–5260 |

-continued

FURTHER PROPERTIES OF EXAMPLE 27

2. Stability after 1000 miles at 50 mph in a tire.
   No separation of liquid or crumb from the grease.
   Width across the tire—8.6 cm.
3. Sealing of nail holes (0.084" diameter) - 8 examined.
   1 sealed without running
   7 sealed on running (maximum pressure loss 0.5 psi - 3.46 k Pa).
4. Sealing of drilled holes

| Hole size[a] | Pressure loss | (psi)[b] | (k Pa) |
|---|---|---|---|
| 63 | 5.5 | 37.9 | (k Pa) |
| 38 | 5.0 | 34.5 | |
| 36 | 3.0 | 20.7 | |
| 16 | 3.0 | 20.7 | |
| 26 | 4.5 | 31.0 | |
| 26 | 3.75 | 25.9 | |
| 38 | 4.75 | 32.8 | |
| 25 | 5.0 | 34.5 | |

[a]expressed as a leak rate (cc/sec) at 5 psi (34.5 k Pa)
[b]initial pressure 28 psi (193.2 k Pa)

Table 3

| Example No. | Composition | | | | | Viscosity(Ns/m² at 0.31s⁻¹) | | | Stability in tire[b] (1000 miles at 50 mph) |
|---|---|---|---|---|---|---|---|---|---|
| | Hyvis 10 | Amide wax | AC8 | Crumb[a] | Others | Room Temp. | 80° C. | Flow Temp(°C.) | |
| 17 | 94 | 7.5 | 4.0 | — | — | 7200–8240 | 3080–3390 | 135–140 | — |
| 18 | 94 | 7.5 | 4.0 | 53 | — | — | — | 152 | satis.8.9cm |
| 19 | 94 | 7.5 | 4.0 | — | Rigidex 140/60-2 | 9620–11,400 | 3510–4170 | 140 | — |
| 20 | 94 | 7.5 | 4.0 | 53 | Rigidex 140/60-2 | — | — | 152 | satis.8.5cm |
| 21 | 94 | 7.5 | — | — | Carlona KY61-2.7[c] | >12,100 | 5510–7020 | 140 | — |
| 22 | 94 | 7.5 | 4.0 | — | Polysar 301-3 | 8770–11,450 | 2720–3570 | 135 | — |
| 23 | 94 | 7.5 | 4.0 | — | Dutral TP20X-2.5[d] | 10,800–12,100 | 3210–3960 | 126 | — |
| 24 | 94 | 7.5 | 4.0 | 54 | Dutral TP20X-2.5[d] | — | — | 146 | satis.8.8cm |
| 25 | 94 | 7.5 | 4.0 | — | Nordel 1500-2.5[e] | >12,100 | 2900–5150 | 128–135 | — |

[a]20 mesh rubber crumb used
[b]Satis. indicates no separation of liquid or crumb from the grease. The figure quoted is the axial width of puncture sealant coating in the tire.
[c]Carlona KY61 is a polypropylene.
[d]Dutral TP20X is an ethylene-propylene-diene monomer terpolymer.
[e]Nordel 1500 is an ethylene-propylene-diene monomer terpolymer having a high ethylene content.

Having now described my invention what I claim is:

1. A pneumatic tire to the interior surface of which there has been applied a puncture sealant containing: (a) a lubricant which facilitates relative movement between contacting portions of said interior surface when the tire is driven in a deflated condition, said lubricant comprising a polybutene; and (b) an amide wax.

2. A tire according to claim 1, in which the polybutene lubricant is comprised of a major proportion of polyisobutylene gelled by the amide wax.

3. A tire according to claim 1, in which the sealant contains a solid particulate filler.

4. A tire according to claim 3, in which said filler is a rubber crumb.

5. A tire according to claim 4, in which rubber crumb: polyisobutylene ratio is in the range from 1:10 to 7.5:10 by weight.

6. A tire according to claim 5, in which said ratio is in the range from 2:10 to 6:10 by weight.

7. A tire according to claim 2, in which the polyisobutylene has a number average molecular weight in the range from 750 to about 2,500.

8. A tire according to claim 1, in which the amide wax is present in an amount up to 20% by weight of the total weight of lubricant and amide wax.

9. A tire according to claim 8, in which said amount is in the range from 3 to 12% by weight.

10. A tire according to claim 1, in which the amide wax is one of the general formula:

$$R_1-CO-NH-R_3-NH-CO-R_2$$

where $R_1$ and $R_2$, which can be the same or different, are each a long chain hydrocarbon radical and $R_3$ is an alkylene radical.

11. A tire according to claim 10, in which $R_1$ or $R_2$ is an alkyl radical.

12. A tire according to claim 11, in which $R_1$ and $R_2$ are alkyl radicals having from 12 to 35 carbon atoms.

13. A tire according to claim 11, in which $R_1$ and $R_2$ are alkyl radicals whose total number of carbon atoms is in the range from 35 to 50.

14. A tire according to claim 10, in which the alkylene radical has up to six carbon atoms.

15. A tire according to claim 10, in which $R_1$ is $C_{17}H_{35}-$, $R_2$ is $C_{27}H_{55}-$ and $R_3$ is $-CH_2-CH_2-$.

16. A tire according to claim 1, in which the sealant contains as a gelling agent a polyolefin.

17. A tire according to claim 16, in which the sealant contains as an auxiliary gelling agent for the lubricant a low density polyethylene.

18. A tire according to claim 2, in which the sealant contains an elastomer in an amount of up to 10% by weight of the polyisobutylene.

19. A tire according to claim 18, in which said elastomer is selected from the group consisting of butyl rubbers and EPDM rubbers.

20. A tire according to claim 18, in which the amount of said elastomer is in the range from 2 to 6% by weight of the polyisobutylene.

* * * * *